HOMER W. MADDEN,
INVENTOR.

BY
FULWIDER, MATTINGLY & HUNTLEY.
ATTORNEYS.

Feb. 26, 1957 H. W. MADDEN 2,782,578
STACKING APPARATUS
Filed May 13, 1954 8 Sheets-Sheet 3
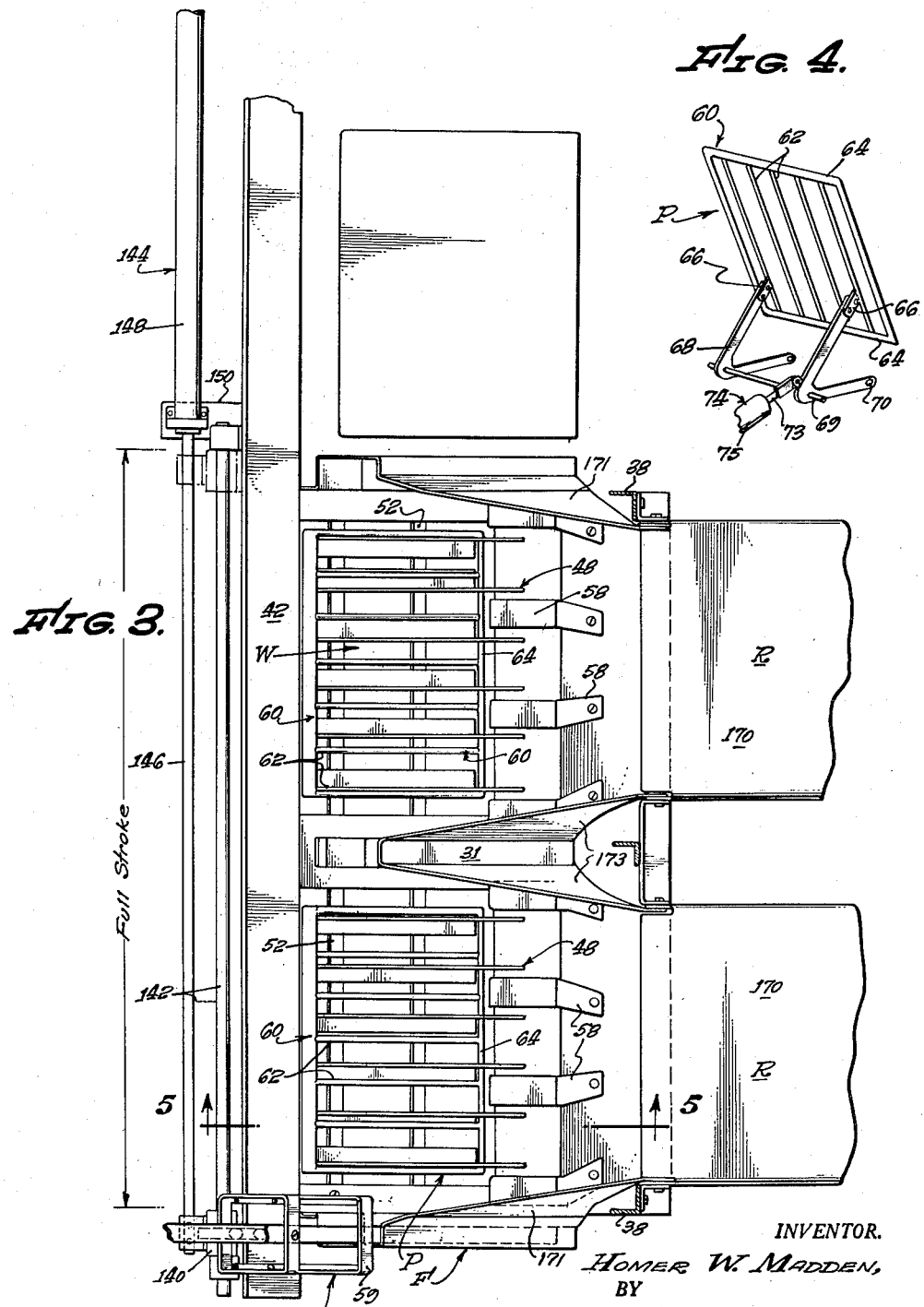
INVENTOR.
HOMER W. MADDEN,
BY
FULWIDER, MATTINGLY & HUNTLEY.
ATTORNEYS.

Feb. 26, 1957 H. W. MADDEN 2,782,578
STACKING APPARATUS
Filed May 13, 1954 8 Sheets-Sheet 4

HOMER W. MADDEN,
INVENTOR.

BY
FULWIDER, MATTINGLY & HUNTLEY.
ATTORNEYS.

Feb. 26, 1957 H. W. MADDEN 2,782,578
STACKING APPARATUS
Filed May 13, 1954 8 Sheets-Sheet 5

HOMER W. MADDEN,
INVENTOR.

BY HULWIDER, MATTINGLY & HUNTLEY.
ATTORNEYS.

Feb. 26, 1957  H. W. MADDEN  2,782,578
STACKING APPARATUS
Filed May 13, 1954  8 Sheets-Sheet 6
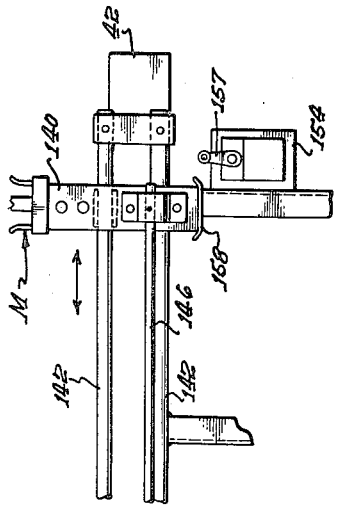
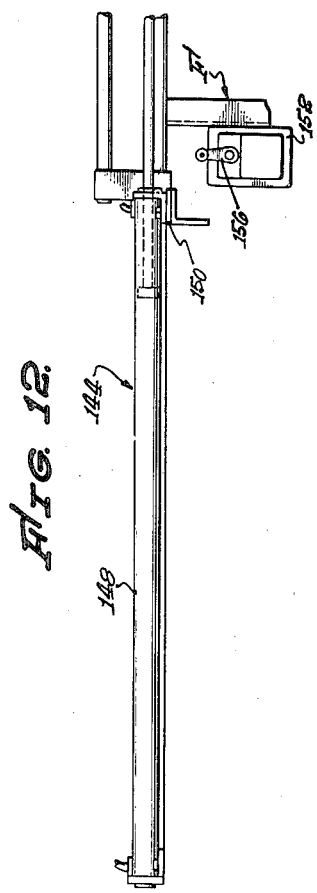
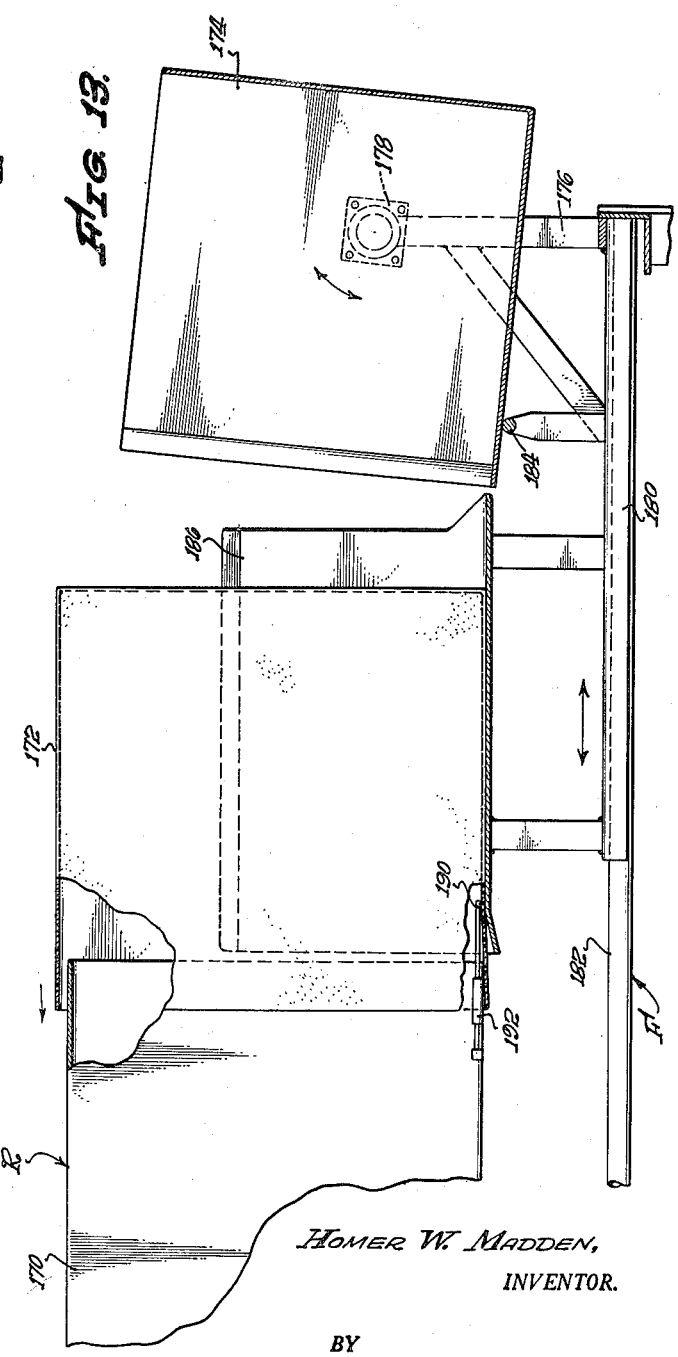
HOMER W. MADDEN,
INVENTOR.
BY
FULWIDER, MATTINGLY & HUNTLEY.
ATTORNEYS.

Feb. 26, 1957 H. W. MADDEN 2,782,578
STACKING APPARATUS
Filed May 13, 1954 8 Sheets-Sheet 7
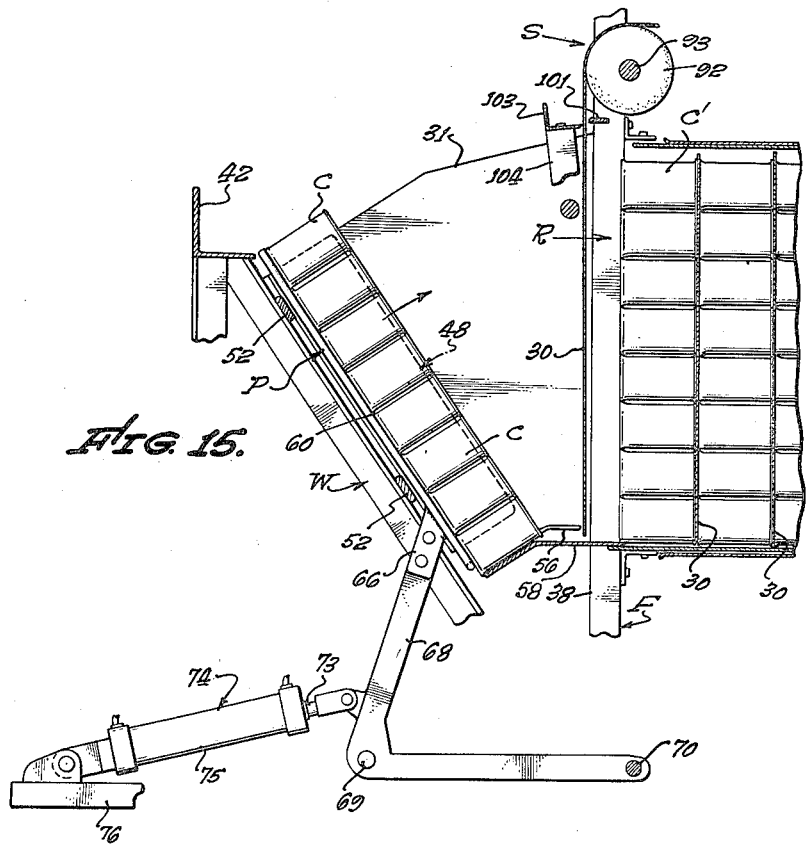
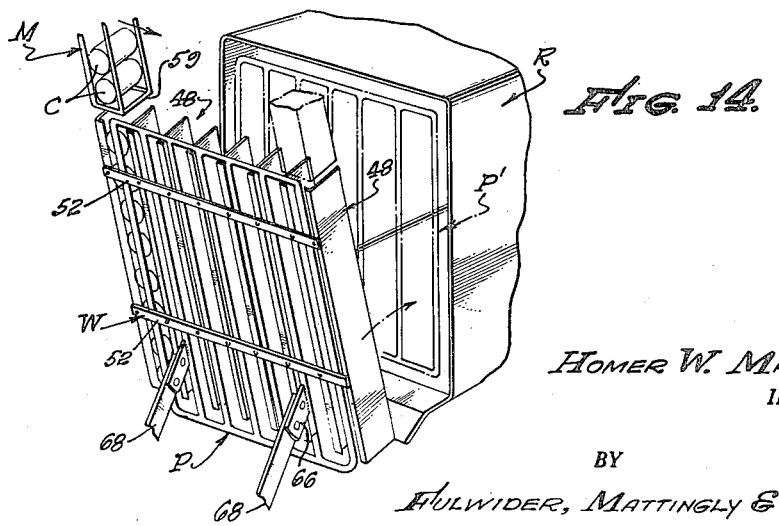
Homer W. Madden,
INVENTOR.
BY
Fulwider, Mattingly & Huntley.
ATTORNEYS.

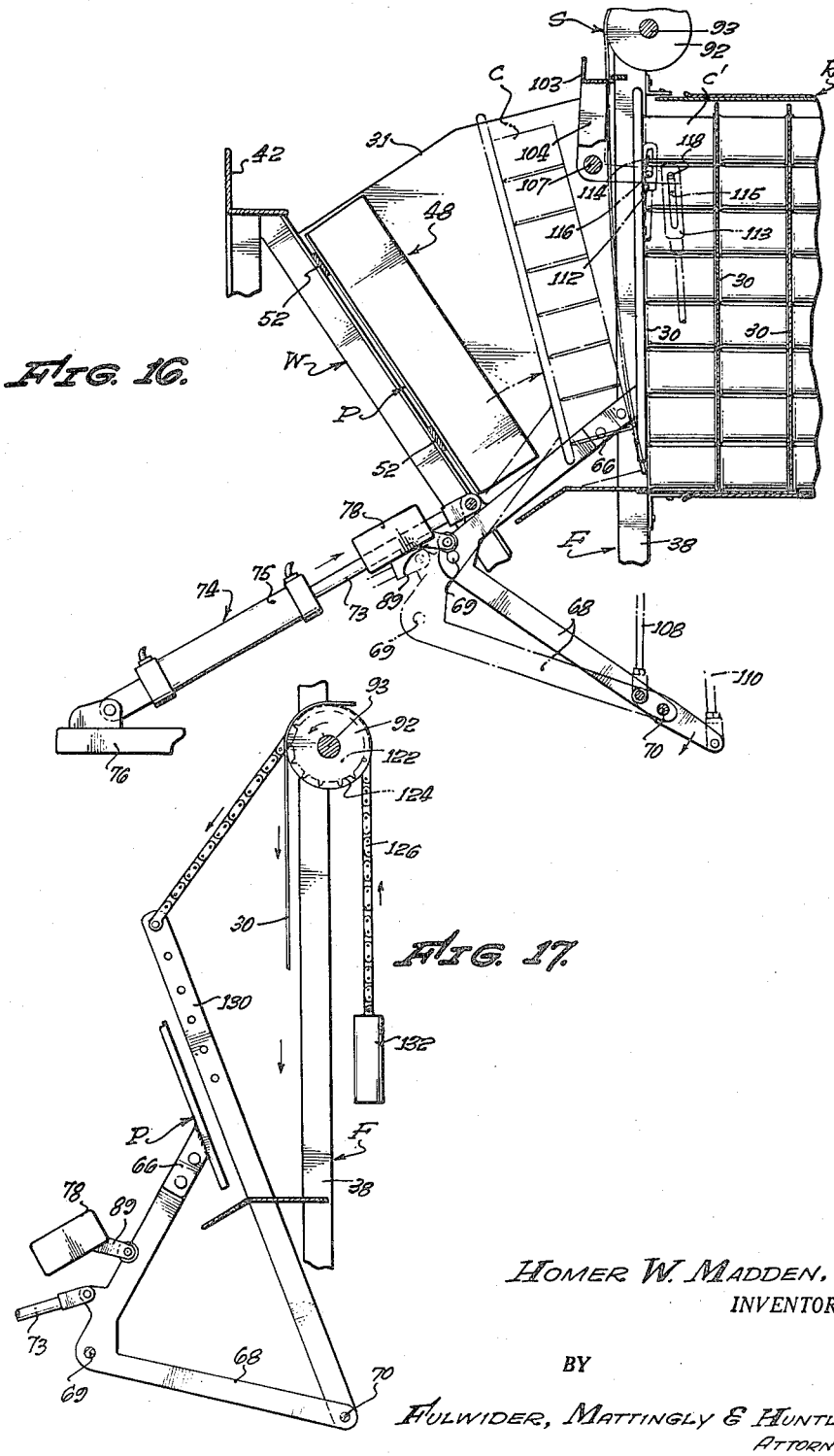

United States Patent Office 2,782,578
Patented Feb. 26, 1957

2,782,578

STACKING APPARATUS

Homer W. Madden, Hanover, Ind.

Application May 13, 1954, Serial No. 429,424

18 Claims. (Cl. 53—61)

The present invention relates generally to power-operated material handling apparatus and more particularly to novel stacking apparatus for use in stacking tin cans, small packages and the like for storage or shipment.

A major object of the present invention is to provide power-operated stacking apparatus for stacking tin cans or the like whereby a considerable saving in time and labor may be effected over the conventional manual stacking operation, a single apparatus of the present invention being adapted to free several workmen for other activities.

Another object is to provide can stacking apparatus which is completely automatic in operation.

A further object of the invention is to provide can stacking apparatus that is compact in size whereby it will occupy but a comparatively small amount of floor space.

Yet another object of the present invention is to provide can stacking apparatus which is capable of handling a large number of cans in a relatively short period of time.

The more particular object is to provide can stacking apparatus adapted to stack tin cans or the like in bags or cartons wherein such cans are fed singly into the apparatus and are initially stacked therein in an inclined position, the cans thereafter being disposed in a stacked condition in an upright position and being finally urged from such upright position into a bag or carton in abutting relationship with a previously positioned stack of cans already disposed in the bag or carton.

An additional object of the invention is to provide can stacking apparatus of the aforedescribed nature which includes means for automatically positioning a sheet of paper between adjacent stacks of cans.

Yet another object is to provide can stacking apparatus of the aforedescribed nature which is comparatively simple in design and rugged of construction whereby it may afford a long and trouble-free service life.

These and other objects and advantages of the present invention will become apparent from the following detailed description, when taken in conjunction with the appended drawings wherein:

Figure 3 is a horizontal sectional view taken on line 3—3 of Figure 1;

Figure 4 is a perspective showing of a pusher member utilized in said apparatus;

Figure 5 is an enlarged vertical sectional view taken on line 5—5 of Figure 3;

Figure 6 is a diagonal sectional view taken on line 6—6 of Figure 5;

Figure 7 is a diagonal sectional view taken on line 7—7 of Figure 5;

Figure 12 is a front view taken along a line indicated by 12—12 in Figure 1;

Figure 13 is a side elevational view constituting a continuation from the right side of Figure 1;

Figures 14 through 17 are diagrammatic representations showing the mode of operation of said apparatus during a can stacking operation.

Figure 1:
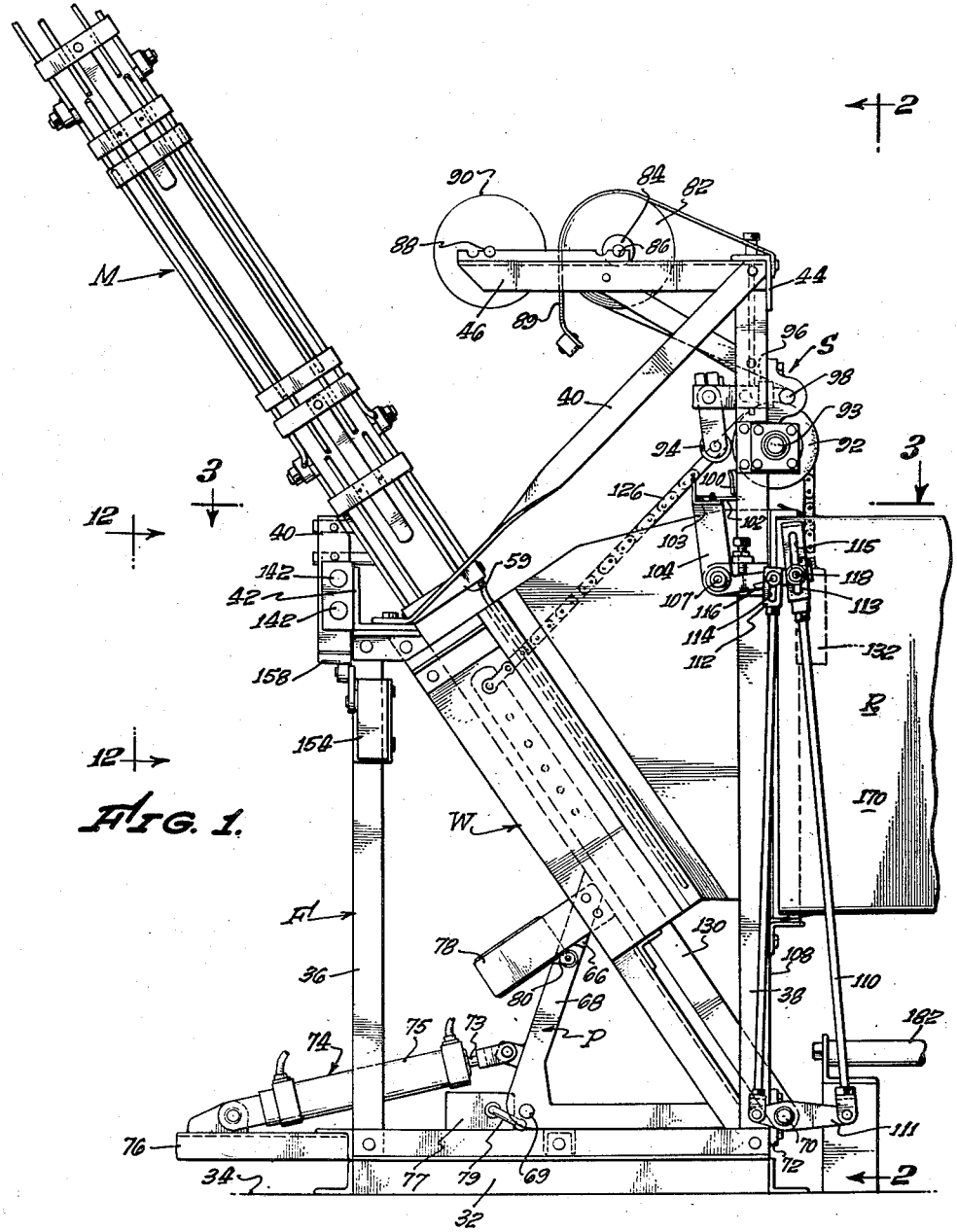
Figure 1 is a side elevational view of can stacking apparatus embodying the present invention.

Referring to the drawings, the preferred form of can stacking apparatus embodying the present invention includes a stationary frame F having an inclined wall W against the rear of which cans C are adapted to be stacked in courses, can feeding means M for stacking the cans against the rear of the wall W, a pusher member P normally disposed forwardly of the inclined wall W and movable rearwardly to an upright position whereby the cans which were initially stacked against the inclined wall will be urged rearwardly into the front of a receptacle R in abutting relationship with a stack of cans C' that have already been disposed therein, and means generally designated S for positioning a sheet of paper 30 between each of the rows of cans.

More particularly, and with reference to Figures 1 through 6 it should be understood that the frame F may incorporate one or more stations each comprising a length of inclined wall W, a pusher member P and a receptacle R. In the preferred embodiment disclosed herein, the frame F utilizes a length of inclined wall which is divided into two parts by a divider 31, each of which parts cooperate with an identical pusher member P and an identical receptacle R. The frame F includes a base 32 adapted to rest upon the surface of a floor 34 and a pair of upright front and rear side elements 36 and 38, respectively, at each of its sides. The tops of the latter are each rigidly connected by a diagonal frame element 40. An L-shaped channel member 42 extends horizontally between the tops of the front side elements 36. A second L-shaped channel element 44 rigidly connects the tops of the rear side elements 38. A pair of forwardly extending channel-shaped members 46 are rigidly affixed at their rear ends to the top of the rear side elements 38. The inclined wall W is formed of a plurality of generally L-shaped members 48 which are rigidly secured to a pair of horizontally extending cross-pieces 52 having their sides secured to side elements 36. As shown in Figure 6, the longer legs 54 of each of the L-shaped members 48 serve as separators for dividing the inclined wall W into a plurality of channels. Referring now to Figures 5 and 7, inasmuch as the rows of cans C must be staggered in certain applications, a riser 56 is disposed at the bottom of every other channel defined by the inclined wall. It will be observed that the rear of these risers 56 as well as the rear of the bottom element 58 of the inclined wall W extends rearwardly and upwardly to a point adjacent the front end of the receptacle R.

The can feeding means M may take the form of a chute that is fully described in my copending patent application Telescopic Can and Package Conveying Chute Serial No. 379,621 filed September 9, 1953. The mouth 59 of this chute is adapted to travel across the top of the inclined wall W so as to successively load each of the channels thereof with a row of cans C in a manner to be more fully described hereinafter.

As shown in Figure 4, each pusher member P includes a flat grate-like element 60 having a plurality of generally vertically extending bars 62 each of which is initially disposed within one of the channels defined by the legs 54 of the L-shaped members 48 of the inclined wall W, as indicated in Figure 5. These bars 62 are connected at their upper and lower ends by horizontal cross-pieces 64. Two of the bars 62 of each grate-like element 60 are rigidly affixed as by welding to a pair of brackets 66. Each of these brackets is in turn bolted to the top of a generally V-shaped pivot arm 68. The mid-portion of the pivot arms 68 are rigidly interconnected by a horizontally extending stiffener bar 69. The rear end of the lower leg of each of the latter arms 68 is keyed to a horizontal shaft 70. This horizontal shaft 70 is journaled within strap bearings 72 which are rigidly secured to the rear of the side frame elements 38. The front of the upper leg of one of the pivot arms 68 is pivotally secured to the free end of the plunger 73 of a hydraulic cylinder and plunger unit, generally designated 74. The front end of the cylinder 75 of this unit is pivotally secured to a frontal extension 76 of the frame F, as indicated in Figure 1. With this arrangement, at such time as the plunger 73 is extended relative to its cylinder 75 the pivot arm 68 will pivot about the axis of the horizontal shaft 70 whereby the pusher members P will move from their normal inclined positions of Figures 1, 5 and 15 to an upright position adjacent the front end of the receptacle R indicated in dotted outline P' in Figure 14. The operation of the cylinder and plunger unit 76 is controlled by a pair of microswitches 77 and 78 mounted by the frame F, each microswitch including an arm 79 and 80, respectively, adapted to be engaged by the stiffener bar 69.

Figure 10:
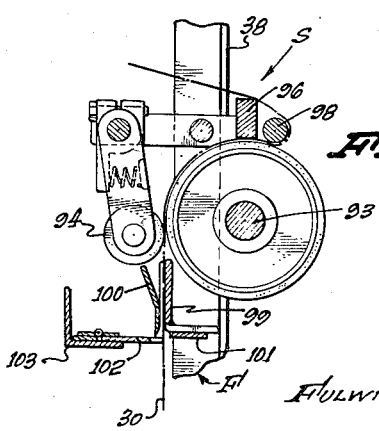
Figure 10 is a vertical sectional view taken on line 10—10 of Figure 8.
Figure 11:
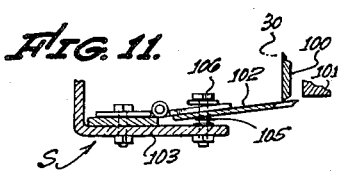
Figure 11 is an enlarged vertical sectional view taken on line 11—11 of Figure 9.

The paper feeding means S is adapted to position a sheet of paper 30 over the front of the receptacle between each adjoining stack of cans disposed within the receptacle R. The paper supply may comprise a pair of rolls 82, each of which is carried upon a pair of spools 84 that are rotatably disposed within aligned notches 86 formed in the frame elements 46. Weighted straps 89 serve to retain the rolls 82 in place. If desired additional aligned notches 88 may be formed in the frame members 46 forwardly of the notches 86 for supporting a spare roll of paper 90 (shown in dotted outline in Figure 1). The paper is adapted to be transferred from the roll 82 to the front of the receptacle R by means of a pair of feed rollers 92 against which a plurality of smaller rearwardly biased idler rollers 94 are engaged. The feed rollers 92 are keyed to a horizontal shaft 93 journaled by the frame F. As indicated in Figure 10, the paper feeding means S may include a horizontally-extending guide 96 of rectangular cross-section and a curl breaking bar 98 mounted rearwardly thereof. The paper from the roll 82 may be passed rearwardly over the top of the guide 96 and thence downwardly around the rear of the curl breaking bar 98. From the underside of the latter the paper extends forwardly and downwardly over the front top portion of the feed rollers 92, then downwardly between the latter and idler rollers 94. The paper then passes downwardly between a horizontal frame cross-piece 99 and an elongated guide plate 100 disposed forwardly thereof. A horizontal shear bar 101 is rigidly mounted to the underside of the frame cross-piece 99. A rearwardly movable cutting blade 102 is disposed adjacent the shear bar 101 for separating the individual paper sheets 30 from the paper contained upon the roll 82. The cutting blade 102 is disposed in a horizontal plane and it is hingedly carried by an L-shaped horizontal support channel 103 having its sides rigidly affixed to the upper ends of a pair of generally L-shaped arm members 104. As indicated in Figure 11, the cutting blade 102 is constantly biased upwardly against the shear bar 101 by helical coil springs 105 that are interposed between the channel element 103 and the rear hinge pins 106. The mid-portion of each of the arm members 104 is rotatably supported by a pivot bolt 107 carried by a forward extension of each rear frame element 38. The blade 102 is adapted to be moved rearwardly of the arm members 104 about the axis of the bolts 107, as shown viewed in Figure 1. Such pivotal movement may be effected by a pair of front and rear tierods 108 and 110, respectively, which are pivotally connected at their lower ends to the front and rear ends of a pair of crank arms 111 which is keyed to the opposite ends of the horizontal shaft 70. The upper ends of these tierods 108 and 110 are connected to elongated slotted guides 112 and 113, respectively. The slots 114 and 115 of these guides are slidably engaged by bolts 116 and 118, respectively, mounted by the rear portion of the lower leg of the arm members 104.

Figure 2:
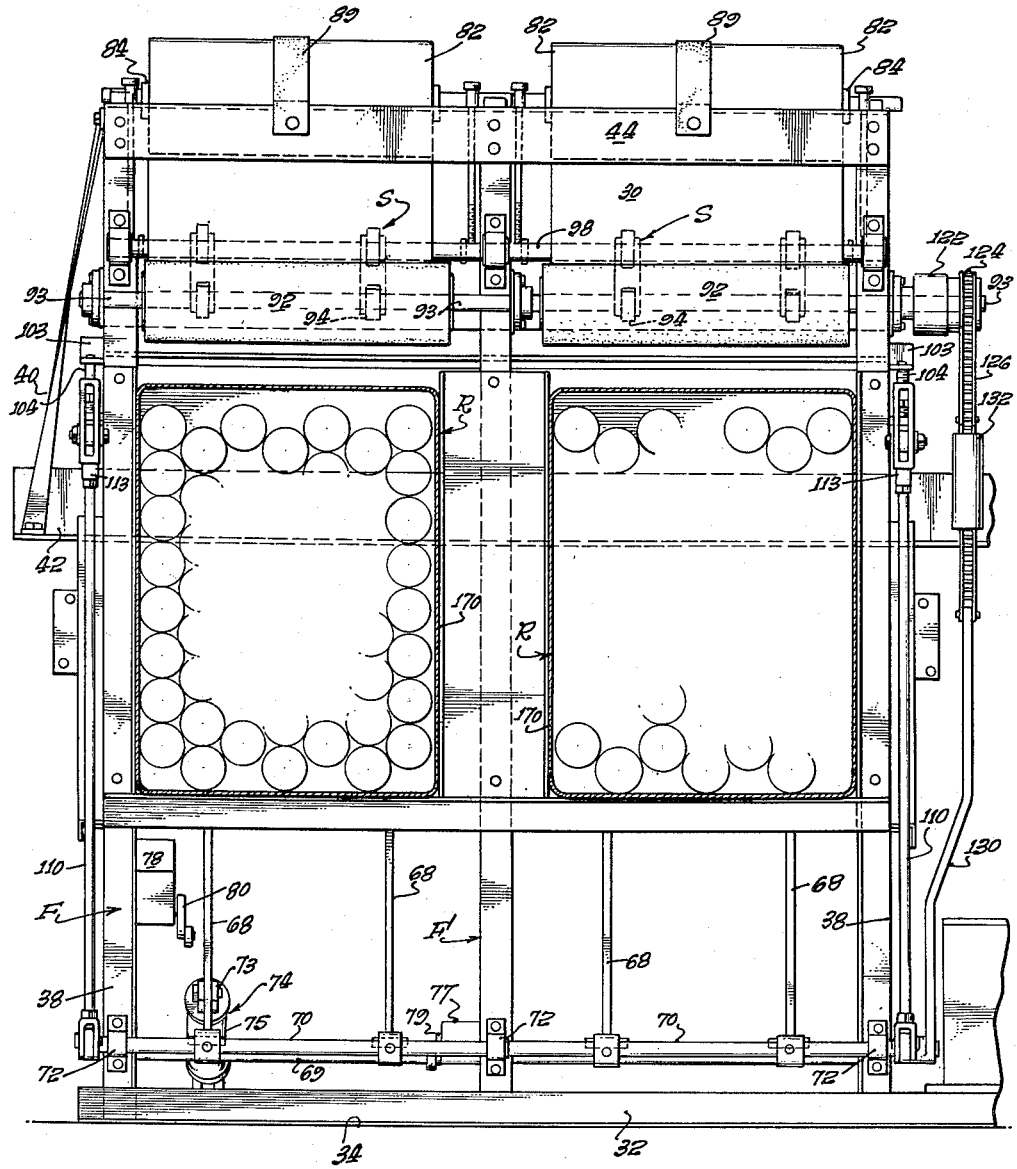
Figure 2 is a rear elevation of said apparatus, taken along a line indicated by 2—2 in Figure 1.
Figure 8:
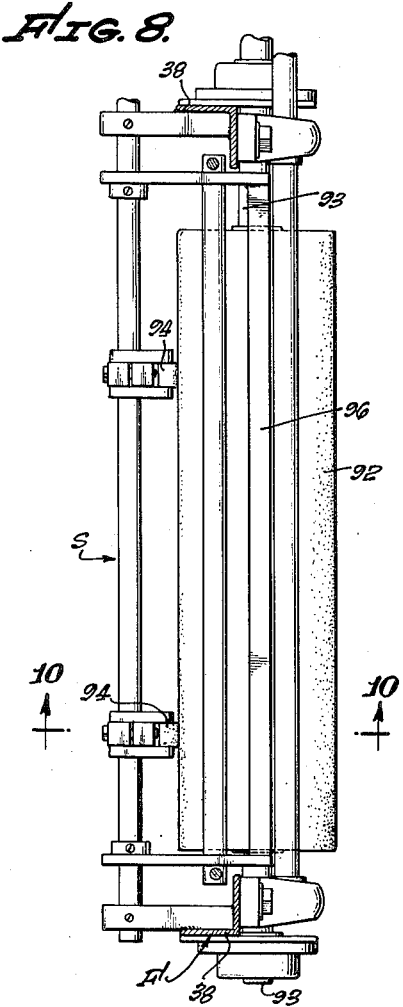
Figure 8 is a top plan view of a paper feeding mechanism utilized with said apparatus.
Figure 9:
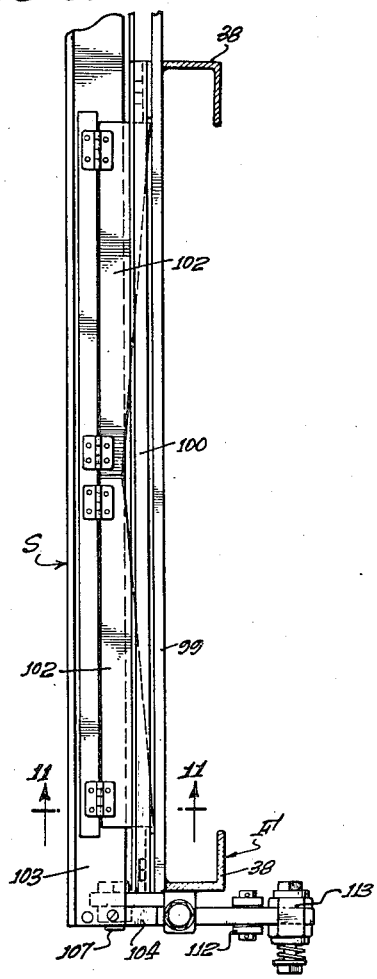
Figure 9 is a top plan view of a cutting device utilized with the paper handling mechanism of Figure 8.

The feed rollers 92 are adapted to be rotated by means of a one-way clutch 122, shown in Figures 2 and 17, in such a manner that the paper will only be urged downwardly in front of the receptacle R when the pusher members P are disposed at a position forwardly of the front end of the receptacles R. This clutch 122 includes a drive sprocket 124 which is engaged by a drive chain 126. The clutch 122, and hence feed roller shaft 93, will only be rotated by the sprocket 124 when the latter is rotating in a counter-clockwise direction as viewed in Figure 1. The front of the drive chain 126 is affixed to a vertically extending arm 130 having its lower end keyed to the shaft 70. A weight 132 is connected to the opposite end of the drive chain 126 in order to maintain the links of the chain 126 in engagement with the teeth of the drive sprocket 124. Referring to Figures 1 and 2, with this arrangement, upon clockwise rotation of the shaft 70 under the influence of the hydraulic cylinder and plunger unit 76 the top of the arm 130 will be pivoted rearwardly and upwardly whereby the weight 132 will drop and cause the chain 126 to rotate the drive sprocket 124 in a clockwise direction. Because of the one-way clutch 122 this rotation will not be transferred to the feed roller shaft 93. When, however, the arm 130 is being returned to its original position the drive sprocket 124 will rotate clutch 122, feed roller shaft 93, and hence feed rollers 92 in a counter-clockwise direction. In this manner a sheet of paper 30 will be forced downwardly in front of each of the receptacles R.

Referring now to Figures 1, 3 and 12, the mouth 50 of the can feeding chute M is secured to a block 140 which is slidably carried by a pair of horizontal bars 142 affixed to the front frame element 36. The block 140 is horizontally reciprocated relative to the bars 142 and hence the top of the inclined wall W by means of a second hydraulic cylinder and plunger unit, generally designated 144. The plunger 146 of the latter is secured to the block 140 while the cylinder 148 thereof is affixed to a bracket 150 of the frame F. The operation of the cylinder and plunger unit 144 is controlled by a pair of microswitches 152 and 154 mounted by the front of the frame F, each microswitch including an arm 156 and 157, respectively, adapted to be engaged by either end of a runner 158 carried by the lower end of the block 140.

Referring now to Figures 1 and 13, each of the receptacles R may comprise a tunnel-like chute 170 of rectangular cross-section that is rigidly supported by the frame F. Each chute 170 is open at both its front and rear ends. The cans C received through the front end of the chute 170 are adapted to be packed within the confines of a paper or cardboard bag 172. The bags 172 are of rectangular configuration and of somewhat larger size than the chutes 170 whereby they may encompass the latter. After a bag 172 has been filled with cans it is adapted to be moved into a bucket member 174 that is pivotally mounted at the rear of the frame F. In this manner a filled bag may be tilted whereby its open top end will be pointed upwardly.

As shown in Figure 13 the buckets 174 are mounted between a pair of uprights 176 by bearings 178. The lower ends of the uprights are rigidly secured to the rear end of a pair of runners 180 which are horizontally slidably carried by a pair of rails 182 forming a fixed portion of the frame F. A stop member 184 is secured to the runners 180 ahead of the uprights 176 for maintaining each bucket 174 at the correct angle to receive a filled bag. The front portion of the runners 180 rigidly mount a transfer member 186 for the filled bags. Each transfer member 186 is U-shaped in vertical cross-section and is somewhat wider than a bag 172.

In the operation of the preferred form of apparatus an empty bag 172 is first slipped over the rear of both of the receptacle chutes 170 until the front or open ends of the bags are disposed adjacent the front end of the chutes. The positioning of the bags over the chutes 170 is accomplished by arranging the bags within the transfer members 186 as shown in Figure 13. The bags 172 may be held to the chutes 170 by means of horizontal rods 190 that are slidably supported by pipes 192 affixed to the bottom rear portion of each chute. Thereafter, the assembly comprising the runners 180, transfer members 186 and buckets 184 are slid forwardly towards the front end of the apparatus. Once the bags 172 have been properly positioned the can feeding chute M may be set in operation, the mouth 59 of the can feeding chute is caused to reciprocate along the top of the inclined wall W at such a speed that the channels of the inclined wall W may be successively filled with cans C. This can feeding process is shown in Figure 14. Referring thereto, the mouth 59 of the chute M may be initially disposed at the left side of the inclined wall W. It will remain in a position above the first channel of this wall for a period of time required to fill the latter with cans to its upper end. Thereafter, the chute will move to the right until it is disposed above the second channel. The second channel will then be filled in a manner similar to the first and the chute will again move to the right. Referring now to Figure 12, at such time as the mouth 59 of the chute M reaches a position above the last of the channels of the inclined wall to be filled, the runner 158 of block 140 will engage the arm 157 of microswitch 154 so as to trip the latter. The tripping of this microswitch 154 will through suitable electrical and hydraulic connections cause the motion of the second cylinder plunger unit 144 to be halted and cause the first cylinder and plunger unit 74 to effect a rearward stroke of the latter's plunger 73. Thus, the travel of can feeding chute will be stopped while the pusher members P will be caused to pivot rearwardly. As indicated in Figure 16, the rearward pivotal movement of these pusher members will serve to transfer the cans C from their original stacked position of Figure 15 abutting the inclined wall W into the front of the chutes 170. It should be particularly noted that as the stacked cans C move rearwardly toward the front of the chutes 170 they will be urged together by the rearwardly and inwardly sloping side plates 171 and center plates 173 of the frame F. Simultaneously, the risers 56 cause alternate courses of the cans C to be raised relative to the frame F. In this manner, the cans C are compacted tightly as they enter the front of the chutes 170 to form their original loosely disposed arrangement adjacent the inclined wall W. When the stacked cans C enter the front of these chutes 170 they will force the row of cans C' which have already been stacked within the chute rearwardly. The sheet of paper 30 which was previously positioned in front of the chutes 170 will be interposed between the cans C' and C and hence urged rearwardly within the chutes.

When the pusher members P in moving rearwardly reach a position adjacent the front of the chutes 170 the stiffener bar 69 will engage the arm 80 of the upper microswitch 78, as shown in Figure 16. Such engagement effects a tripping of this microswitch. The tripping of this microswitch through suitable electrical and hydraulic connections will cause the plunger 73 to reverse its direction of movement and the pusher members will be pivoted forwardly towards their original position adjacent the inclined wall W.

During this return movement of the pusher members P, the arm 130 through its rigid connection to shaft 70 will likewise be pivoted forwardly in a counterclockwise direction as viewed in Figures 1 and 17. As noted previously hereinbefore, such movement of the arm 130 will, through the drive chain 126 and drive sprocket 124, cause the feed rollers 92 to urge another length of paper 30 downwardly over the front of the chutes 170. This length of paper 30 will be cut from the rest of the roll 82 by rearward movement of the cutter blade 102 in a manner described immediately hereinafter.

The cutter blade 102 is moved between its rearwardly disposed position of Figure 1 and its forwardly disposed position of Figure 16 through its connection to the shaft 70 by means of the tierods 108 and 110. This blade 102 is initially disposed in its position of Figure 1 and as the pusher elements P are urged rearwardly the cutter blade will remain in its initial position until the pusher members P have reached a position indicated by the dotted lines in Figure 16. At this time the bolts 116 and 118 will be engaged by the lower and the upper ends, respectively, of the slots 114 and 115 of guides 112 and 113, and the arm members 104 will be pivoted in a clockwise direction, as viewed in Figure 16, so as to move the blade forwardly so as to shear off a sheet of paper 30. It is necessary that the cutter blade so remain in a forwardly disposed position for a sufficient length of time as to permit a sheet of paper 30 to be moved downwardly in front of the chutes 170. The required time interval is provided by means of the slotted guides 112 and 113, which guides together with the bolts 116 and 118 serve as a lost-motion mechanism between the shaft 70 and the cutter blade 102.

When the pusher members P approach their original position adjacent the inclined wall W, the stiffener bars 69 will engage the arm 79 of the lower microswitch 77. The tripping of this microswitch through suitable electrical and hydraulic connection will cause movement of the first cylinder and plunger unit 74 to stop and initiate reverse movement of the second cylinder and plunger unit 144. Thus, the can feeding chute M will commence movement to the left in Figure 12 so as to refill the channels of the inclined wall W. When the runner 158 of the chute block 140 trips the arm 156 of the microswitch 152 operation of the second cylinder and plunger unit 144 will again take place and the first cylinder and plunger unit 74 will be caused to undergo a second rearward stroke.

Although there has been shown and described what is presently believed to be the preferred embodiment of the present invention, various modifications and changes may be made thereto without departing from the spirit of the invention or the scope of the following claims. Thus, it is possible to extend the frame F sidewards so as to incorporate additional bag packing stations, in which case one or more additional can feeding chutes M would be required. If desirable the second cylinder and plunger unit 144 might be arranged to drive one or more of such chutes.

I claim:

1. Apparatus for stacking a plurality of articles into a receptacle, comprising: a frame having a vertically inclined wall; feeding means for disposing a plurality of said articles in aligned courses against the rear of said inclined wall; a horizontal shaft carried by said frame; a pusher member connected to said shaft and normally disposed forwardly of said wall, said pusher member being moved rearwardly and upwardly to an upright position by rotation of said shaft; power-operated means interposed between said pusher member and said frame; a roll of paper carried by said frame; paper feeding means operated by the rotation of said shaft for positioning a length of paper in front of said receptacle; and, cutter means operated by the rotation of said shaft for cutting said length of paper from said roll.

2. Apparatus as set forth in claim 1 wherein a lost-motion linkage is interposed between said shaft and said cutter means whereby said length may be positioned in front of said receptacle before said pusher member reaches said upright position.

3. Apparatus as set forth in claim 2 wherein a one-way clutch is interposed between said shaft and said paper feeding means whereby the latter only functions during a return stroke of said pusher member toward its normal position.

4. Apparatus for stacking a plurality of articles into a receptacle, comprising: a frame having a vertically inclined wall; feeding means for disposing a plurality of said articles in aligned courses against the rear of said inclined wall; a horizontal shaft carried by said frame; a pusher member connected to said shaft and normally disposed forwardly of said wall, said pusher member being moved rearwardly and upwardly to an upright position by rotation of said shaft; power-operated means interposed between said pusher member and said frame; a roll of paper carried by said frame; a feed roller mounted on said frame above the front portion of said receptacle and having an axis of rotation parallel to said shaft; a one-way clutch interposed between said shaft and said feed roller whereby the latter will only rotate during a return stroke of said pusher member toward its normal position, so as to position a length of paper in front of said receptacle; a cutting blade mounted on said frame below said feed roller and movable horizontally so as to cut off said length of paper from said roll; and, a lost-motion linkage interposed between said shaft and said cutting blade whereby the latter will only be actuated to effect a cut after said length has been positioned in front of said receptacle.

5. Apparatus as set forth in claim 4 where said power-operated means is a fluid-actuated cylinder and plunger unit.

6. Apparatus for stacking a plurality of articles into a receptacle, comprising: a frame having a fixed forwardly and upwardly inclined wall that is divided into a plurality of vertically extending channels for receiving a plurality of said articles; a pusher member carried by said frame having a plurality of vertically extending bars that are normally disposed within said channels forwardly of said articles; and, power-operated means interposed between said frame and said pusher member for moving the latter rearwardly and upwardly relative to said fixed wall from its normal position to a generally upright position whereby said articles will be urged into the front of said receptacle in vertically aligned relationship.

7. Apparatus for stacking a plurality of articles into a receptacle, comprising: a frame having a forwardly and upwardly inclined wall that is divided into a plurality of vertically extending channels for receiving a plurality of said articles; a horizontal shaft carried by said frame; a pusher member carried by said shaft having a plurality of vertically extending bars that are normally disposed within said channels forwardly of said articles; a roll of paper carried by said frame; paper feeding means operated by the rotation of said shaft for positioning a length of paper in front of said receptacle; cutter means operated by the rotation of said shaft for cutting said length of paper from said roll; and, power-operated means for effecting rotation of said shaft.

8. Apparatus as set forth in claim 7 where said power-operated means includes a fluid-actuated cylinder and plunger unit that is interposed between said pusher member and said frame, said pusher member being locked to said shaft.

9. Apparatus for stacking a plurality of articles into a receptacle, comprising: a frame having a forwardly and upwardly inclined wall that is divided into a plurality of vertically extending channels for receiving a plurality of said articles; a horizontal shaft carried by said frame; a roll of paper carried by said frame; a pusher member carried by said shaft having a plurality of vertically extending bars that are normally disposed within said channels forwardly of said articles; a feed roller mounted on said frame above the front portion of said receptacle and having an axis of rotation parallel to said shaft; a one-way clutch interposed between said shaft and said feed roller whereby the latter will only rotate during a return stroke of said pusher member toward its normal position, so as to position a length of paper in front of said receptacle; a cutting blade mounted on said frame below said feed roller and movable horizontally so as to cut off said length of paper from said roll; a lost-motion linkage interposed between said shaft and said cutting blade whereby the latter will only be actuated to effect a cut after said length has been positioned in front of said receptacle; and, power-operated means for effecting rotation of said shaft.

10. Apparatus as set forth in claim 9 where said power-operated means includes a fluid-actuated cylinder and plunger unit that is interposed between said pusher member and said frame, said pusher member being locked to said shaft.

11. Apparatus for stacking a plurality of articles into a receptacle, comprising: a frame having a fixed forwardly and upwardly inclined wall that is divided into a plurality of vertically extending channels for receiving a plurality of said articles; article feeding means operatively connected with said frame for successively filling each of said channels with said articles; a pusher member carried by said frame having a plurality of vertically extending bars that are normally disposed within said channels forwardly of said articles; power-operated means interposed between said frame and said pusher member for moving the latter rearwardly and upwardly from its normal position relative to said fixed wall to a generally upright position whereby said articles will be urged into the front of said receptacle in vertically aligned relationship; and, means interposed between said article feeding means and said pusher member for causing the latter to start moving away from its normal position only after said channels have each been filled.

12. Apparatus for stacking a plurality of articles into a receptacle, comprising: a frame having a fixed forwardly and upwardly inclined wall that is divided into a plurality of vertically extending channels for receiving a plurality of said articles; article feeding means operatively connected with said frame for successively filling each of said channels with said articles; first power-operated means for operating said article feeding means; a pusher member carried by said frame having a plurality of vertically extending bars that are normally disposed within said channels forwardly of said articles; second power-operated means interposed between said frame and said pusher member for moving the latter rearwardly and upwardly from its normal position relative to said fixed wall to a generally upright position whereby said articles will be urged into the front of said receptacle in vertically aligned relationship; and, automatic control means interposed between said power-operated means for causing said article feeding means to fill said channels during a single working movement of said pusher member.

13. Apparatus as set forth in claim 12 where said power-operated means include electric switch controlled hydraulic cylinder and plunger units and said automatic control unit includes a plurality of electric switches engaged by said article feeding means and said pusher members during their operation, the latter switches being operatively connected to the former.

14. Apparatus for stacking a plurality of articles into a receptacle, comprising: a frame having a vertically inclined wall; feeding means for disposing a plurality of said articles in aligned courses against the rear of said inclined wall; a horizontal shaft carried by said frame;

a pusher member connected to said shaft and normally disposed forwardly of said wall, said pusher member being moved rearwardly and upwardly to an upright position by rotation of said shaft; power-operated means interposed between said pusher member and said frame; a roll of paper carried by said frame; a feed roller mounted on said frame above the front portion of said receptacle and having an axis of rotation parallel to said shaft; an idler roller adjacent said feed roller; a horizontally extending guide parallel to and below said feed roller on said frame, said guide being of rectangular cross-section; a curl breaking bar mounted rearwardly of said guide; a drive sprocket carried by said frame; a one-way clutch interposed between said feed roller and said sprocket; an arm secured at its lower end to said shaft; a chain connecting the upper end of said arm and said sprocket; a weight secured to the free end of said chain; a shear bar mounted upon said frame adjacent the upper end of the front of said receptacle and parallel to said shaft; a cutting blade disposed adjacent said shear bar; arm members at either side of said blade and pivotally connected to said frame for supporting said blade, said arms being formed with elongated slots; a pair of crank arms keyed to said shaft; and, tierods interposed between said arm members and said crank arms, the upper end of each of said tierods being slidably secured to said arm members by a bolt disposed within one of said slots.

15. Apparatus as set forth in claim 14 where said power-operated means is a hydraulic cylinder and plunger unit.

16. Apparatus for stacking a plurality of articles having an annular cross-section into a receptacle, comprising: a frame having a vertically inclined wall; feeding means for disposing a plurality of said articles in aligned courses against the rear of said inclined wall; a pusher member operatively connected to said frame and normally disposed forwardly of said inclined wall but movable rearwardly and upwardly to an upright position whereby said articles will be urged into the front of said receptacle in vertical alignment; riser means on said frame for causing alternate courses of said articles to be lifted vertically as they are moved rearwardly and upwardly into the front of said receptacle by said pusher member; and, guide means formed on said frame forwardly of the front of said receptacles for causing said articles to be urged together as they are moved rearwardly and upwardly into the front of said receptacle.

17. Apparatus as set forth in claim 16 wherein said frame carries means for positioning a sheet of paper in front of said receptacle prior to the insertion of said articles therein.

18. Apparatus for stacking a plurality of articles having an annular cross-section into a receptacle, comprising: a frame having a vertically inclined wall; feeding means for disposing a plurality of said articles in aligned courses against the rear of said inclined wall; a horizontal shaft rotatably carried by said frame; a pusher member connected to said shaft and normally disposed forwardly of said wall, said pusher member being moved rearwardly and upwardly towards an upright position by rotation of said shaft; riser means on said frame for causing alternate courses of said cans to be lifted vertically as they are moved rearwardly and upwardly into the front of said receptacle by said pusher member; guide means formed on said frame forwardly of the front of said receptacle for causing said cans to be urged together as they are moved rearwardly and upwardly into the front of said receptacle by said pusher member; and, means operatively connected to said shaft for positioning a sheet of paper in front of said receptacle prior to the insertion of said articles therein.

References Cited in the file of this patent
UNITED STATES PATENTS

| | | |
|---|---|---|
| 2,364,113 | Van Roo | Dec. 5, 1944 |
| 2,492,894 | Schroder | Dec. 27, 1949 |